United States Patent

[11] 3,610,973

| [72] | Inventors | James A. Bauer<br>Murrysville;<br>Dexter V. Wright, Pittsburgh, both of Pa. |
|---|---|---|
| [21] | Appl. No. | 1,354 |
| [22] | Filed | Jan. 8, 1970 |
| [45] | Patented | Oct. 5, 1971 |
| [73] | Assignee | Westinghouse Electric Corporation<br>Pittsburgh, Pa. |

[54] VIBRATION PICKUP DEVICE
11 Claims, 6 Drawing Figs.

[52] U.S. Cl. .................................................... 310/15,
340/17, 336/30
[51] Int. Cl. ............................................... H02k 35/00
[50] Field of Search ............................................ 336/30,
110; 310/12–15, 25, 27; 340/17; 73/71.2, 71.4

[56] References Cited
UNITED STATES PATENTS

| 2,271,864 | 2/1942 | Honnell et al. | 340/17 |
| 2,296,754 | 9/1942 | Wolf et al. | 310/25 X |
| 2,651,769 | 9/1953 | Stafford | 340/17 |
| 2,745,085 | 5/1956 | McCarty et al. | 340/17 |
| 3,470,399 | 9/1969 | Johnson et al. | 310/13 |
| 3,504,320 | 3/1970 | Engdahl et al. | 336/110 |

*Primary Examiner*—D. F. Duggan
*Attorneys*—A. T. Stratton, F. P. Lyle and F. Cristiano, Jr.

ABSTRACT: A vibration pickup device used to measure the vibrational velocity of a vibrating body and comprising an outer casing which acts as a magnetic shield, and an inner casing structure which is connected to an electrical ground. The inner casing structure houses a permanent magnet, a pair of bucking coils, and a pair of insulated seismic mounting springs. A coil structure is seismically mounted between the springs linking the steady magnetic field. Upon movement of the casing structures caused by the vibrations of the vibrating body, the magnetic field also moves and cuts the coil windings, producing an alternating voltage in the windings proportional to the vibrational movement. The bucking coils and the magnetic shielding minimize the effect of stray alternating electromagnetic fields and the grounded inner casing minimizes the effect of stray electrostatic fields.

PATENTED OCT 5 1971

WITNESSES
Theodore F. Wrobel
Bruce L. Samlan

INVENTORS
James A. Bauer
and Dexter V. Wright
BY

VIBRATION PICKUP DEVICE

BACKGROUND OF THE INVENTION

The following disclosure relates to apparatus for measuring the vibrations of a vibrating body and more particularly to a vibration pickup device used to measure the velocity of vibrations of a rotary body.

In balancing equipment generally used to measure rotor unbalance, a phase reference generating unit is fastened to an end of a rotary body, its output being fed into a first input on a meter unit. A suitable vibration pickup device measures the velocity of vibration of the rotary body and its output is fed into a second input on the meter unit. The two inputs have different peak voltages and phase angles from which can be determined the amount of the unbalanced mass and the angular location of the unbalanced mass. These values are read on the output of the metering unit.

Vibration pickups of the velocity type are generally preferred in balancing applications rather than pickups of the displacement or acceleration type because they generate a relatively large output signal, have a low impedance, and especially because they emphasize the running speed vibration component (which is the only one of interest in balancing) and minimize the lower and higher frequency vibration components. Velocity pickups can measure small running-speed vibrations without any electrical filtering of the signal being required in most cases, whereas signals from displacement or acceleration sections must usually be filtered. In addition, alternating stresses in operating machinery usually tend to be proportional to vibration velocity rather than to vibration displacement or acceleration. Therefore a velocity signal is usually preferred in general purpose measurements of machinery vibration.

The main disadvantage of velocity pickups is that the output signal can be affected by external operating conditions such as stray electromagnetic and electrostatic fields. These stray fields cause additional voltages to be generated which results in an inaccurate reading since the alternating voltage produced is no longer directly proportional to the velocity of the vibrating body.

Balancing systems which may use pickups of this type are shown in U.S. Pat. No. 2,636,381 to A. C. Hagg and D. V. Wright issued Apr. 28, 1953 and U.S. Pat. application Ser. No. 886,695 to J. A. Bauer filed Dec. 19, 1969 (Westinghouse Case No. 40,854), both of which are assigned to the present assignee.

In balancing large rotors, such as are used in turbines and generators, the electrostatic and electromagnetic fields are often very substantial so that the output voltage on a vibration pickup device which is very sensitive to these fields is adversely affected by these fields. In fact, the rotors on many large turbines and generators have an electric potential relative to ground, and it is not uncommon for the pickup devices to operate in a magnetic field of five gauss or even more.

It would be desirable then to design a vibration pickup device which can be employed in a balancing system that has an output signal directly proportional to the velocity of the vibrating body which will be unaffected by stray electrostatic and electromagnetic fields.

SUMMARY OF THE INVENTION

The following disclosure relates to a vibration pickup device which may be used in a balancing system to measure the velocity of vibrations of a vibrating body.

The pickup device comprises an outer casing which acts as a magnetic shield, the casing being secured to a mounting base. A magnetic shield plate is inserted between the outer casing and the base. Inside the outer casing, and fastened to the magnetic shield plate, is an insulator onto which a ground inner casing structure is secured. The inner casing structure comprises an inner casing and a magnet frame. The frame houses a permanent magnet which creates a steady magnetic field, and two wound coils, one on each end of the inner casing and termed the outer and inner bucking coils. Two seismic mounting springs are secured in the inner casing structure, but insulated therefrom, and are on opposite ends of the casing structure. The springs support a seismically mounted coil structure which has a wound coil suspended from the structure which is linked with the magnetic field created by the permanent magnet. The coil is electrically connected in series with the bucking coils.

In the preferred embodiment, which is called the internal seismic mode of operation, the base, and outer magnetic shield attached thereto, are either in direct contact with the rotating shaft or are on a rigid structure which is directly on the rotatable shaft. In this mode, the base, the outer casing, and the inner casing structure follow the motion of the vibrating body. The coil structure remains relatively stationary and as the magnetic field moves, the field is cut by the coil on the coil structure producing an alternating voltage directly proportional to the velocity of the vibrating body.

In the second embodiment, which is called the prod mode of operation, a prod is attached to the inner coil structure and projects through the mounting base to come into contact with the vibrating body. In this mode, the inner coil structure vibrates conforming to the motion of the vibrating body. The coil structure cuts the flux lines of the magnetic field and a corresponding alternating voltage is produced which is proportional to the velocity of the vibrating body.

As previously mentioned, electrostatic and electromagnetic fields which may surround the pickup device adversely affect the performance of the device especially when used to measure the vibrations of large rotors. To minimize the electromagnetic effect, the outer casing and the shield plate act as a magnetic shield to shunt a large percentage of the electromagnetic field around the pickup device. Furthermore, the outer and inner bucking coils effectively subtract most of the voltage introduced by the stray magnetic fields entering the inner casing structure. Finally, the electrostatic fields are virtually eliminated by grounding the inner casing.

DETAILED DESCRIPTION OF THE PREFERRED EMBODIMENT

Figure 1:
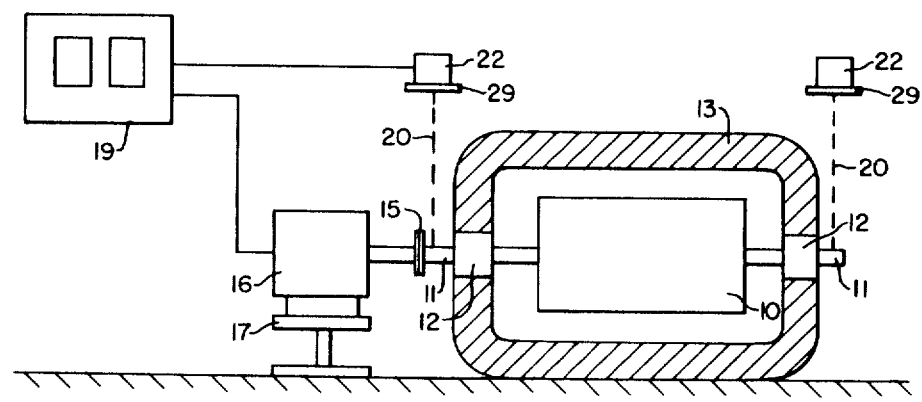
FIG. 1 is a schematic view of a typical system for balancing a vibrating rotary body and using a vibration pickup device formed in accordance with the invention.

Referring to the drawings in detail, and particularly to FIG. 1, there is shown a rotary body 10 having journal portions 11 which are supported in bearings 12, with the rotary body being housed in an outer casing 13. On one end of one journal 11 is a flange 15, the flange being connected to a phase reference generating unit 16. The generating unit 16 may be supported on a stand 17 which is secured to ground. The phase generating unit 16 is electrically connected to a first input of a metering unit 19. Mounted on rigid rods 20 (indicated by the dashed lines) are vibration pickup devices 22 formed in accordance with the principles of this invention. One of the pickup devices 22 is connected to a second input on the metering unit 19. Preferably, the phase reference generating unit 16 and the metering unit 19 are of the types shown in the J. A. Bauer application previously cited. It must be pointed out, however, that the rotary body 10, the phase reference generating unit 16 and the metering unit 19 comprise no part of the invention.

Figure 2:
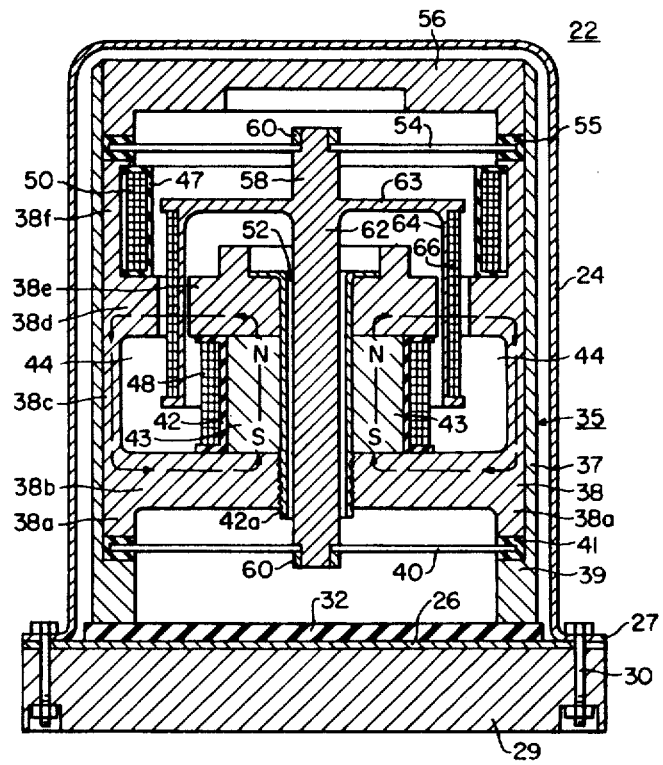
FIG. 2 is an enlarged axial view in section, of one of the pickup devices shown in FIG. 1.

Referring to FIG. 2, it can be seen that the pickup device 22 comprises an outer casing 24, which is cup-shaped, and a disc-shaped magnetic shield plate 26 which abuts an annular lip portion 27 of the outer casing 24. The other side of the magnetic shield plate 26 abuts a disc-shaped mounting base 29. Fastening means 30, such as bolts, may be used to secure the outer casing 24, the plate 26, and the base 29 together. A disc-shaped insulator 32 is secured to the shield plate 26. An inner casing structure 35 is mounted on the insulator 32 and electrically insulated thereby from the outer casing 24, the shield plate 26 and the base 29. The inner casing structure 35 comprises a tubular inner casing 37 and a tubular magnet frame 38. The inner casing 37 has a uniform outside diameter but has a smaller inside diameter on its lower end forming an annular shoulder 39 nearest the insulator 32. The shoulder 39 of the inner casing 37 supports a disc-shaped, concentrically arranged seismic mounting spring 40 which is insulated from the inner casing 37 and magnet frame 38 such as by the annular insulator member 41. It is desirable that the spring 40 have a natural frequency beyond the operating range of the pickup device and that the spring operate linearly in an axial direction. A preferred spring is disclosed in J. A. Bauer U.S. Pat. application Ser. No. 886,694 J. A. Bauer filed Dec. 19, 1969 (Westinghouse Case No. 41,109).

The magnet frame 38, which is preferably a good magnetic conductor, such as iron, is disposed concentrically within the inner casing 37. The frame 38 has an annular end portion 38a, a lower disc portion 38b, a tubular lower middle portion 38c, an annular middle portion 38d, a second disc portion 38e, and a tubular top portion 38f. The spring 40 is held captive about its periphery between the end portion 38a and the shoulder 39 of the inner casing 37. The outer diameter of the frame 38 is slightly smaller than the larger inner diameter of the inner casing 37. The end portion 38a of the magnet frame 38 has an inner diameter equal to the smaller inner diameter at the insulator end 39 of the inner casing 37.

The second portion 38e of the frame 38 is secured to the frame by fastening means such as a holddown hollow centered bolt 42a. The second portion 38e, the lower portion 38d, the bolt 42a captively hold an annular flanged coil form 42 and a tubular-shaped permanent magnet 43. The lower portion 38b, the lower middle portion 38c, the middle portion 38d and the second portion 38e of the magnet frame 41 and the permanent magnet 43 jointly define an annular compartment 44. There is a ringlike opening 46 between the middle portion 38d and the second portion 38e of the magnet frame 38 opening into the compartment 44. Wound on the radially outer surface of the coil form 42 in the compartment 44 is an adjustably wound coil 48 defined as the inner bucking coil. Radially inward from the top portion 38f of the frame 38 is a second annular flanged coil form 47 around which is a second adjustably wound coil 50 defined as the outer bucking coil. Both bucking coils 48 and 50 are wound concentrically with the inner casing structure 35. The frame 38 has a central bore portion 52.

The top portion 38f of the magnet frame 38 supports a second seismic mounting spring 54 which is substantially similar to the first seismic spring 40. The spring 54 is electrically insulated from the frame 38 and the inner casing 37 such as by an annular insulating member 55. A cover plate 56, which is disc-shaped, has an outside diameter which is slightly smaller than the larger inside diameter of the inner casing 37 and fits in the inner casing to secure the second spring 54 to the inner casing structure 35. Seismically mounted in the central portions of the springs 40 and 54, which are axially aligned with a central bore portion 52 of the magnet frame 38, is a seismically mounted coil structure 58. The coil structure 58 is secured to the springs 40 and 54 by suitable fastening means 60. The coil structure 58 has a vertically extending rigid shaft portion 62. Extending horizontally in a radially outward direction from the shaft portion 62 is a disc-shaped portion 63. At the radially outer end of the disc-shaped portion 63 is a tubular-shaped flanged portion 64 extending downward from the disc-shaped portion 63 and it is parallel to and concentric with the rigid shaft portion 62. The tubular portion 64 extends through the ringlike opening 46 into the annular compartment 44. Encompassing the flanged portion 64 is a wound coil 66. The coil 66, the flanged portion 64, the disc portion 63 and the rigid shaft portion 62 comprise the seismically mounted coil structure 58. The inner casing 37, the magnet frame 38, the magnet 43, the bucking coils 48 and 50, and the cover plate 56 comprise the inner casing structure 35.

The unbalance of the rotary body 10 (FIG. 1) is measurable as a vibration on the journal portion 11. The vibration is transmitted through the rigid shaft 20 which is secured to the mounting base 29. In the preferred embodiment, the base 29, the outer casing 24, the shield plate 26 and the inner casing structure 35 oscillate in unison at the same frequency as the journal 11 of the vibrating body 10. The coil structure 58, suspended from the springs 40 and 54, remains relatively stationary since it is seismically mounted above its natural frequency of approximately 10 c.p.s. The permanent magnet 43 sets up a magnetic field which follows the path indicated by the arrows in FIG. 2. In the internal seismic mode, the magnetic field moves vertically following the motion of the vibrating body, and the wound coil 66 on the flanged portion 64 of the coil structure 58 cuts the moving field so that a voltage is produced in the windings of the coil 66 which is proportional to the velocity of the vibrations. Since, as in this case, the motion produced is sinusoidal, the voltage produced in the coil 66 will be proportional to the product of the displacement of the movable portion of the pickup 22 times the frequency of the vibration. The velocity is out of phase with the displacement and leads the displacement by 90°. As shown in FIG. 1, the voltage produced in the pickup 22 is fed into a second input in the metering unit 19, where the sine waves generated will be compared with the sine waves generated from the phase reference generating unit 16.

As previously mentioned, the main problems with velocity pickups were that electrostatic and electromagnetic fields adversely affected the voltage output. In early designs, little or no means were used to eliminate these stray fields. The double case design of the pickup 22, comprising outer casing 24, magnetic shield plate 26 and inner casing 37, has been employed to protect the moving coils 66, bucking coils 48 and 50 and interconnecting wiring from essentially all of the stray electromagnetic fields.

Figure 4:
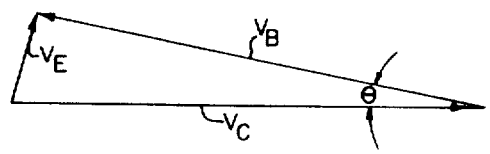
FIG. 4 is a voltage diagram indicating the phase relation of the voltage of the prior pickup devices.

In pickups presently employed, a single bucking coil is often provided to minimize the adverse effects of the stray fields entering the pickup. However, referring to FIG. 4, where $V_C$ is the error voltage induced in the coil structure and $V_B$ is the voltage induced in a single bucking coil, complete cancellation of the error voltage $V_C$ cannot be obtained because of a phase shift as indicated by angle $\theta$ which occurs between the voltage $V_C$ induced in the wound coil and the voltage $V_B$ induced in the bucking coil. The phase shift occurs because of the pattern of the external flux entering the outer casing 24 and saturating one portion of the pickup 22 at a time. FIG. 4 indicates that even when adjusting the number of turns on the bucking coil so that the bucking coil voltage $V_B$ has been adjusted to its optimum value to cancel out the error voltage $V_C$, a net error output voltage $V_E$ equal to the product of the error voltage $V_C$ in the wound coil times the sine of the phase angle $\theta$ will still result.

Figure 5:
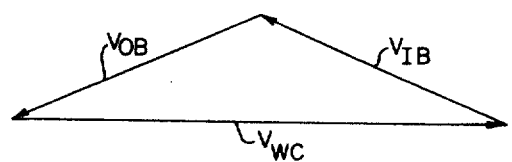
FIG. 5 is a voltage diagram showing the phase relation of the voltages of the present invention.

This problem is solved by the two bucking coils 48 and 50, as shown in FIG. 2, which are adjustably arranged so that, as indicated in FIG. 5, the voltage $V_{IB}$ or $V_{OB}$ induced in one of the bucking coils 48 or 50 leads the error voltage $V_{WC}$ induced in the wound coil 66 and the voltage $V_{OB}$ or $V_{IB}$ induced in the other bucking coil 50 or 48 lags the voltage $V_{WC}$ induced in the coil 66. The number of turns on the bucking coils 48 and 50 can be adjusted so that essentially zero error voltage results. The phase differences in the bucking coils 48 may be obtained in many ways by one skilled in the art. One solution is by positioning the bucking coils in a manner such that the external flux entering the pickup 22 saturates the metallic parts linking the bucking coils 48 and 50 at different times in the same manner which produced the phase difference described above. Then, the use of the double case design and the two bucking coils effectively minimizes both the phase angle and the magnitude of unwanted voltages from stray electromagnetic fields to very nearly zero.

Figure 6:
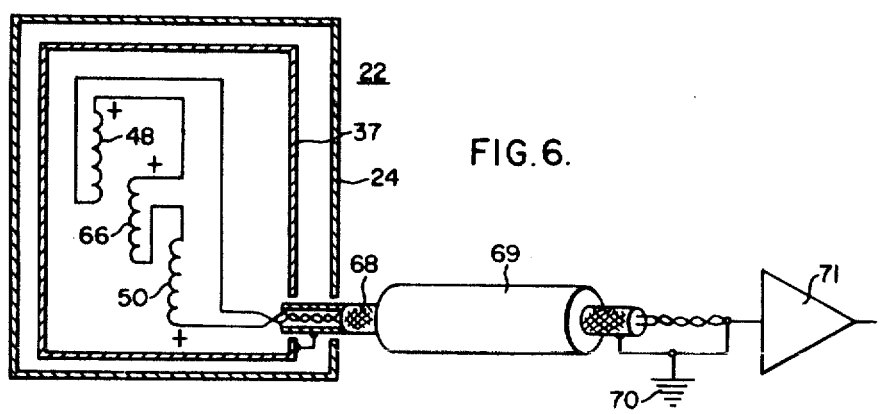
FIG. 6 is a schematic circuit diagram of the vibration pickup device shown in FIGS. 1, 2 and 3.

The actual schematic view representing the electrical connections of the pickup 22 is shown in FIG. 6. The inner bucking coil 48 and the outer bucking coil 50 are connected in series with the wound coil 66. The insulated wires leave the inner casing 37 and the outer casing 24 and are encompassed by a metallic shield 68 and outer insulation 69, to further protect the signal from influences of stray fields. Metallic shield 68 is connected to the system ground 70. The signal may be sent through an amplifier 71 to amplify the signal.

As previously mentioned, it is common for the rotating body or the machine frame to have an electrical potential relative to ground. This is because of shaft currents in electrical machines as a result of magnetic and winding unbalances or homopolar action, or because of electrostatic voltages generated by steam flow. Therefore, voltages may appear on the base 29 and the outer casing 24 (FIG. 2). Voltages may also appear because of the location of the pickup in an electrostatic field. Since the inner casing 37 rests on insulator 32, it is electrically insulated from the outer casing 24. A voltage may, however, appear on the inner casing 37 as a result of the capacitive effect between the two cases 24 and 37. To eliminate the voltage due to the capacitive effect, the inner casing 37 is connected to ground 70 through the metallic shield 68, as shown in FIG. 6. This results in a very low impedance circuit to ground for the inner casing 37 which effectively reduces the voltage potential of the inner case to zero, thus minimizing the electrostatic effect.

A vibration pickup device 22 constructed in accordance with the present invention was tested in a 5 gauss, 60 cycle alternating current field with the outer casing 24 being subjected to a 1 volt alternating current potential. The voltage generated at the output terminal as a result of these "worst case" tests was less than 20 microvolts. This low "noise level" allows a relatively small and lightweight pickup 22 to accurately measure vibrations as small as 2 micro inches single peak at 60 cycles with less than 3 percent error.

DESCRIPTION OF THE SECOND EMBODIMENT

Figure 3:
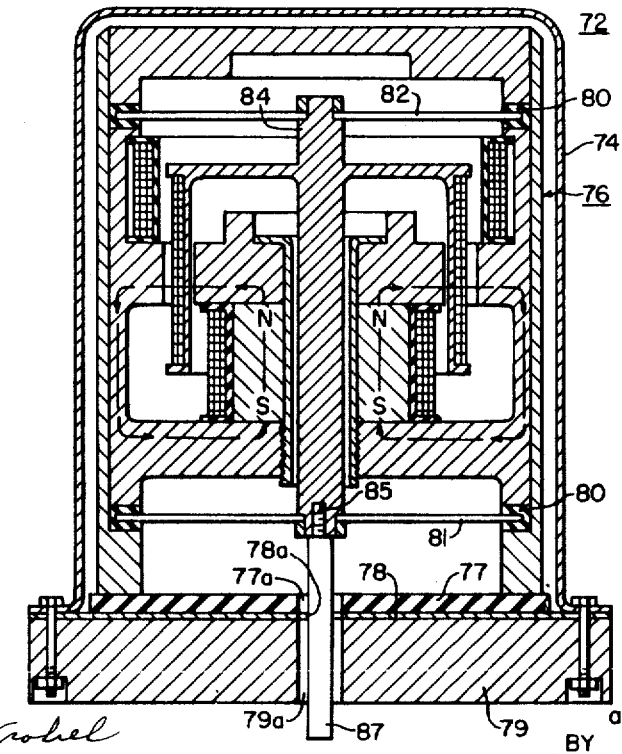
FIG. 3 is a view similar to FIG. 2, but showing another embodiment of the invention.

Referring to FIG. 3, there is shown a second embodiment of a vibration pickup device 72. The pickup 72 is substantially similar to the pickup device 22 shown in FIG. 2. The pickup device 72 has an inverted cup-shaped outer casing 74 and a tubular-shaped inner casing structure 76. The inner casing structure 76 is supported on a disc-shaped insulator 77 which is secured to a disc-shaped magnetic shield plate 78. The outer casing 74 and the shield plate 78 are secured to a mounting base 79. Two mounting springs 81 and 82, similar to springs 40 and 54 in the preferred embodiment, are mounted in the inner casing structure 76 and are insulated therefrom by annular insulating member 80. The springs 81 and 82 axially support a movable coil structure 84. The insulator 77, the shield plate 78 and the mounting base 79 all have equal diametered axially aligned circular apertures 77a, 78a and 79a in their respective central portions. Secured to the bottom portion of the movable coil structure 84, by fastening means 85 such as a screw portion, is prod attachment 87 which is a rigid electrically insulated rod. The prod attachment 87 projects through the apertures 77a, 78a, and 79a. The prod attachment 87 extends to the vibrating body as the rigid shaft 20 does in FIG. 1, to put the pickup 72 in contact with the vibrating body.

In this second embodiment, which can be called the prod mode of operation, the outer casing 74 and the base 79 are relatively stationary, while the prod attachment 87 transmits the vibrations to the movable coil structure 84. In this mode, the steady magnetic field indicated by the arrows in FIG. 3 is stationary and the coil structure 84 oscillates and cuts the magnetic field inducing an alternating voltage proportional to the velocity of the vibration.

The pickup 72 has a double casing design, dual bucking coils, and a ground inner casing as described in the first embodiment.

Although more than one embodiment has been shown, it is intended that all the matter contained in the foregoing description or shown in the accompanying drawings shall be interpreted as illustrative and not in a limiting sense.

We claim:

1. A vibration pickup device to convert the velocity of the vibratory motion of a vibrating body to a corresponding output voltage,
    said device comprising a mounting base,
    a casing structure,
    said casing structure comprising an outer casing structure, which is secured to the mounting base, and an inner casing structure which is concentrically disposed within said outer casing structure and is in spaced relation therewith,
    a permanent magnet housed in said inner casing structure and effective to create a steady magnetic field,
    a coil structure,
    means for seismically mounting said coil structure in spaced relation with said inner casing structure and in linking relation with said magnetic field,
    an outer bucking coil secured to said casing structure,
    an inner bucking coil secured to said casing structure,
    said bucking coils being in bucking relation with said coil structure and are disposed such that voltage induced in one bucking coil leads the voltage induced in the coil structure and the voltage induced in the other bucking coil lags the voltage induced in the coil structure, said bucking coils minimizing the effect of stray electromagnetic fields on the output voltage of said device.

2. The device according to claim 1 wherein the inner and outer bucking coils are secured to the inner casing structure.

3. The device according to claim 1 wherein the mounting means comprises a pair of axially spaced seismic mounting springs.

4. The device according to claim 1 wherein an alternating current voltage is produced in said coil structure as the steady magnetic field is cut by the coil structure, said voltage being directly proportional to the velocity of vibration of the vibrating body.

5. The device according to claim 3 wherein the coil structure and the outer and inner bucking coils are electrically connected, so that the error voltage induced in the coil structure by the stray electromagnetic fields also induces error voltage in the outer bucking coil and the inner bucking coil, so that when the error voltage in the bucking coils is subtracted from the total voltage in the coil structure, the voltage output from the coil structure substantially represents the voltage induced in the coil structure from the motion of the vibrating body.

6. The device described in claim 1 wherein one portion of said coil structure is a wound coil,
    said coil being electrically connected in series with the inner bucking coil and the outer bucking coil,
    and the number of turns in the bucking coils being adjusted so that the error voltage induced in said wound coil by stray fields is subtracted from the error voltage in said wound coil so that there is approximately no error voltage in the output of said wound coil.

7. In a vibration pickup device to convert the velocity of vibrations produced by a vibrating body to a proportional alternating voltage,
    said device comprising a mounting base,
    an outer casing secured to said base,
    an inner casing structure,
    said inner casing structure being electrically insulated from said base and said outer casing structure,
    said inner casing structure being magnetically shielded from said base and outer casing,
    a permanent magnet housed in said inner casing structure and effective to create a steady magnetic field,
    a pair of axially spaced seismic mounting springs secured on opposite ends of said inner casing structure, a coil structure suspended between said springs in spaced relation with said inner casing structure, said field magnetically linking said coil structure, an outer bucking coil secured to said inner casing structure, an inner bucking coil secured to said inner casing structure, said coil structure being electrically connected in series with said inner bucking coil and said outer bucking coil, one of said bucking coils being wound so that the voltage induced therein leads the voltage induced in said coil structure, the other of said bucking coils being wound so that voltage induced therein lags the voltage induced in said coil structure, and the number of turns in said bucking coils being adjusted so that the voltage induced in said bucking coils is subtracted from the voltage induced in said coil structure so that there is approximately no error voltage in the output of said coil structure.

8. The device according to claim 11 wherein there is an aperture in said mounting base, and a prod attachment secured to said coil structure, extending through said aperture.

9. A vibration pickup device to convert the velocity of the vibratory motion of a vibrating body to a corresponding voltage, said device comprising a mounting base, a casing structure secured to said base, a permanent magnet housed in said structure and effective to create a steady magnetic field, a coil structure, means for seismically mounting said coil structure in spaced relation with said casing structure in linking relation with said magnetic field, an outer bucking coil secured to said casing structure, an inner bucking coil secured to said casing structure, said bucking coils being in bucking relation with said coil structure, said casing structure being comprised of an outer casing structure, which is secured to the mounting base, and an inner casing structure which is concentrically disposed within said outer casing structure, and said inner casing structure being electrically insulated from said outer casing structure.

10. A vibration pickup device to convert the velocity of the vibratory motion of a vibrating body to a corresponding voltage, said device comprising a mounting base, a casing structure secured to said base, a permanent magnet housed in said structure and effective to create a steady magnetic field, a coil structure, means for seismically mounting said coil-structure in spaced relation with said casing structure in linking relation with said magnetic field, an outer bucking coil secured to said casing structure, an inner bucking coil secured to said casing structure, said bucking coils being in bucking relation with said coil structure, said casing structure being comprised of an outer casing structure, which is secured to the mounting base, and an inner casing structure which is concentrically disposed within said outer casing structure, one portion of said coil structure being a wound coil, said coil being electrically connected in series with the inner bucking coil and the outer bucking coil, one of the bucking coils being wound so that the error voltage induced in that coil by the stray electromagnetic field leads the error voltage induced in said wound coil, the other of said bucking coils being wound so that the error voltage induced in that bucking coil by the stray electromagnetic field lags the error voltage induced in said wound coil, the number of turns in the bucking coils being adjusted so that the error voltage introduced in said wound coil by the stray fields is subtracted from the error voltage in said wound coil so that there is approximately no error voltage in the output of said wound coil, said mounting means being electrically insulated from said inner casing structure, and the inner casing structure being electrically grounded.

11. A vibration pickup device to convert the velocity of the vibratory motion of a vibrating body to a corresponding voltage, said device comprising a mounting base, a casing structure secured to said base, a permanent magnet housed in said structure and effective to create a steady magnetic field, a coil structure, means for seismically mounting said coil structure in spaced relation with said casing structure in linking relation with said magnetic field, an outer bucking coil secured to said casing structure, an inner bucking coil secured to said casing structure, said bucking coils being in bucking relation with said coil structure, said casing structure being comprised of an outer casing structure, which is secured to the mounting base, and an inner casing structure which is concentrically disposed within said outer casing structure, and said inner casing structure is magnetically shielded from the base by a magnetic shield plate and the outer casing functions as a magnetic shield.